United States Patent [19]

Nitta

[11] Patent Number: 5,506,933
[45] Date of Patent: Apr. 9, 1996

[54] SPEECH RECOGNITION USING CONTINUOUS DENSITY HIDDEN MARKOV MODELS AND THE ORTHOGONALIZING KARHUNEN-LOEVE TRANSFORMATION

[75] Inventor: Tsuneo Nitta, Yokohama, Japan

[73] Assignee: Kabushiki Kaisha Toshiba, Kawasaki, Japan

[21] Appl. No.: 30,618

[22] Filed: Mar. 12, 1993

[30] Foreign Application Priority Data

Mar. 13, 1992 [JP] Japan .................................. 4-055713

[51] Int. Cl.$^6$ .................................................. G10L 9/00
[52] U.S. Cl. .................................. 395/2.65; 395/2.13
[58] Field of Search ............................... 395/2.55–2.66, 395/2.12–2.13

[56] References Cited

U.S. PATENT DOCUMENTS 4,624,011 11/1986 Watanabe et al. ..................... 381/43

OTHER PUBLICATIONS

C. S. Chen, K.-S. Huo, "Karhunen–Loeve Transformation for Data Compression and Speech Synsnesis," *IEEE Proceedings*, v. 138, i.5, pp. 377–380, Oct. 1991.

A. Papoulis, *Probability, Random Varnables, and Stockastic Processes*, McGraw–Hill, N.Y., N.Y., 1984, p. 179.
Parosns, *Voice and Speech Processing*, McGraw Hill, New York, NY (1987), pp. 182–185.

*Primary Examiner*—Allen R. MacDonald
*Assistant Examiner*—Michael A. Sartori
*Attorney, Agent, or Firm*—Finnegan, Henderson, Farabow, Garrett & Dunner

[57] ABSTRACT

A recognition system comprises a feature extractor for extracting a feature vector x from an input speech signal, and a recognizing section for defining continuous density Hidden Markov Models of predetermined categories k as transition network models each having parameters of transition probabilities p(k,i,j) that a state Si transits to a next state Sj and output probabilities g(k,s) that a feature vector x is output in transition from the state Si to one of the states Si and Sj, and recognizing the input signal on the basis of similarity between a sequence X of feature vectors extracted by the feature extractor and the continuous density HMMs. Particularly, the recognizing section includes a memory section for storing a set of orthogonal vectors $\phi_m(k,s)$ provided for the continuous density HMMs, and a modified CDHMM processor for obtaining each of the output probabilities g(k,s) for the continuous density HMMs in accordance with corresponding orthogonal vectors $\phi_m(k,s)$.

8 Claims, 2 Drawing Sheets

SPEECH RECOGNITION USING CONTINUOUS DENSITY HIDDEN MARKOV MODELS AND THE ORTHOGONALIZING KARHUNEN-LOEVE TRANSFORMATION

BACKGROUND OF THE INVENTION

1. Field of the Invention

The present invention relates to a recognition system for recognizing a signal entered in the form of a speech, an image or the like, and more particularly to a recognition system in which Hidden Markov Models (HMMs) are used for recognition.

2. Description of the Related Art

The speech recognition of a discrete HMM scheme has been successful in recent years. In this recognition, a speech signal is converted into a predetermined code sequence by vector-quantization and recognized on the basis of similarity between the code sequence and discrete HMMs. However, the discrete HMM scheme has a defect that the rate of recognition is lowered by quantization errors which occur in the vector-quantization.

A continuous density HMM (CDHMM) scheme has been established to reduce the quantization errors. In the speech recognition of this scheme, a speech signal is recognized by using CDHMMs provided for predetermined categories (words or phonemes). The CDHMM is defined as a transition network model composed of states each having an average vector $\mu(k,s)$ and a covariance matrix $C(k,s)$, where k denotes a category, and s denotes a state. Assume that the CDHMM speech recognition is applied to a ticket vending machine in which speech signals are entered to designate destination places. In this case, words such as "TOKYO", "NAGOYA", "OSAKA" and the like correspond to the categories, and phonemes "T", "O", "K", "Y", and "O" correspond to the states of a network model for "TOKYO". FIG. 1 shows a typical transition network model composed of N states $S_1, S_2, \ldots, S_N$. The initial state $S_1$ is shown at the left end of the transition network model, and the final state $S_N$ is shown at the right end of the transition network model. In this network model, each state transits to a next state with a certain probability (transition probability), and a feature vector is output with a certain probability (output probability) in transition, except for null transition to the same state. Such a network model is called a "Hidden" Markov Model, since only a sequence of output feature vectors is observable.

In the CDHMM speech recognition, the model has two parameters of transition probabilities $p(k,i,j)$ and output probabilities $g(k,i,j)$, where $p(k,i,j)$:
  probability of transiting a state Si to a next state Sj in a model of a category k, and $g(k,i,j)$:
  probability of outputting a feature vector x in transition from the state Si to the state Sj in the model of the category k.

If it is assumed that the same feature vector is output in a self-loop from Si to Si and in transition from Si to Sj, $g(k,i,j)$ can be expressed as $g(k,s)$ using a state s. For the sake of simplicity, $g(k,s)$ is used in the description below. A speech signal is recognized by obtaining a conditional probability $Pr(X|M)$ of each model M outputting a feature vector sequence $X=x1, x2, \ldots$, and evaluating the obtained conditional probability.

FIG. 2 shows a conventional CDHMM speech recognition system.

In this system, a feature extractor 11 extracts a sequence of feature vectors x from an input speech. A switching section SW is switched to supply the feature vector sequence X to a CDHMM processor 12 in a recognition mode. The CDHMM processor 12 reads out average vectors $\mu(k,s)$ and covariance matrices $C(k,s)$ which are provided for categories k and states s and stored in a memory section 13, and defines CDHMMs of the categories k based on the readout average vectors $\mu(k,s)$ and the covariance matrices $C(k,s)$. More specifically, the CDHMM processor 12 initially calculates the following equation (1) to obtain values $g(k,s)$ for the states of each model M.

$$g(k,s) = \log P(k) - \{\log |C(k,s)|\}/2 - [\{x-\mu(k,s)\}^T C^{-1}(k,s)\{x-\mu(k,s)\}]/2 \qquad (1)$$

In equation (1), $P(k)$ represents a fixed value of the probability that a category k appears, T represents a transposition, and $C^{-1}(k,s)$ represents an inverse matrix of $C(k,s)$. The CDHMM processor 12 accumulates the obtained values $g(k,s)$ along the time axis by means of a well-known Viterbi algorithm (e.g., Seiichi Nakagawa, "Speech Recognition by Probability Models", Institute of Electronic and Communication Engineers of Japan, 3.1.3-(c), PP. 44–46) to obtain a conditional probability $Pr(X|M)$ of each model M. A discriminator 15 produces a result of recognition indicating a model M whose conditional probability $Pr(X|M)$ is maximized.

The switching section SW is switched to supply a feature vector sequence X to a training section 14 in a training mode. The training section 14 estimates $\mu(k,s)$ and $C(k,s)$ of the feature vector sequence X, which are required for determining the parameters (i.e., $p(k,i,j)$ and $g(k,s)$) of the model M whose the probability $Pr(X|M)$ is maximized. This parameter estimation can be performed by means of a well-known forward-backward algorithm (e.g., Seiichi Nakagawa, "Speech Recognition by Probability Models", Institute of Electronic and Communication Engineers of Japan, 3.3.2, PP. 69–73).

As described above, the CDHMM processor 12 performs the aforementioned processing on a feature vector sequence of an uttered speech input, and the discriminator 15 discriminates the category of a model M whose probability $Pr(X|M)$ is maximized. The continuous density HMM scheme can achieve a higher recognition rate than the discrete HMM scheme in theory, if the covariance matrices $C(k,s)$ have a large number of dimensions.

However, the conventional CDHMM speech recognition is not suitable for practical use, since a large quantity of training data are required for forming the large covariance matrices $C(k,s)$ and a long processing time are required for calculating the large covariance matrices $C(k,s)$. In order to solve these problems, a method using only diagonal elements of the covariance matrices or a mixture density HMM scheme in which a plurality of distributions are prepared with respect to feature vectors. Although these solutions can solve the problems, it fails to achieve a good recognition rate.

SUMMARY OF THE INVENTION

An object of the present invention is to provide a speech recognition system capable of improving the recognition rate without requiring a large quantity of training data and a large calculation quantity.

The object can be attained by a speech recognition system which comprises a feature extractor for extracting a feature vector x from an input signal, and a recognizing section for defining continuous density Hidden Markov Models of predetermined categories k as transition network models each having parameters of transition probabilities p(k,i,j) that a state Si transits to a next state Sj and output probabilities g(k,s) that a feature vector x is output in transition from the state Si to one of the states Si and Sj, and for recognizing the input signal on the basis of similarity between a sequence X of feature vectors extracted by the extractor and the continuous density HMMs, wherein the recognizing section includes a memory section for storing a set of orthogonal vectors $\phi_m(k,s)$ provided for the continuous density HMMs, and a processing section for obtaining each of the output probabilities g(k,s) for the continuous density HMMs in accordance with corresponding orthogonal vectors $\phi_m(k,s)$.

According to the recognition system, each of the output probabilities g(k,s) is obtained in accordance with corresponding orthogonal vectors $\phi_m(k,s)$. The orthogonal vector set can have a small number (L) of axes by excluding unnecessary vector components which will cause recognition errors. Therefore, the recognition rate can be improved without requiring a large quantity of training data and a large calculation quantity.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

A CDHMM speech recognition system according to a first embodiment of the present invention will now be described with reference to FIG. 3.

Figure 3:
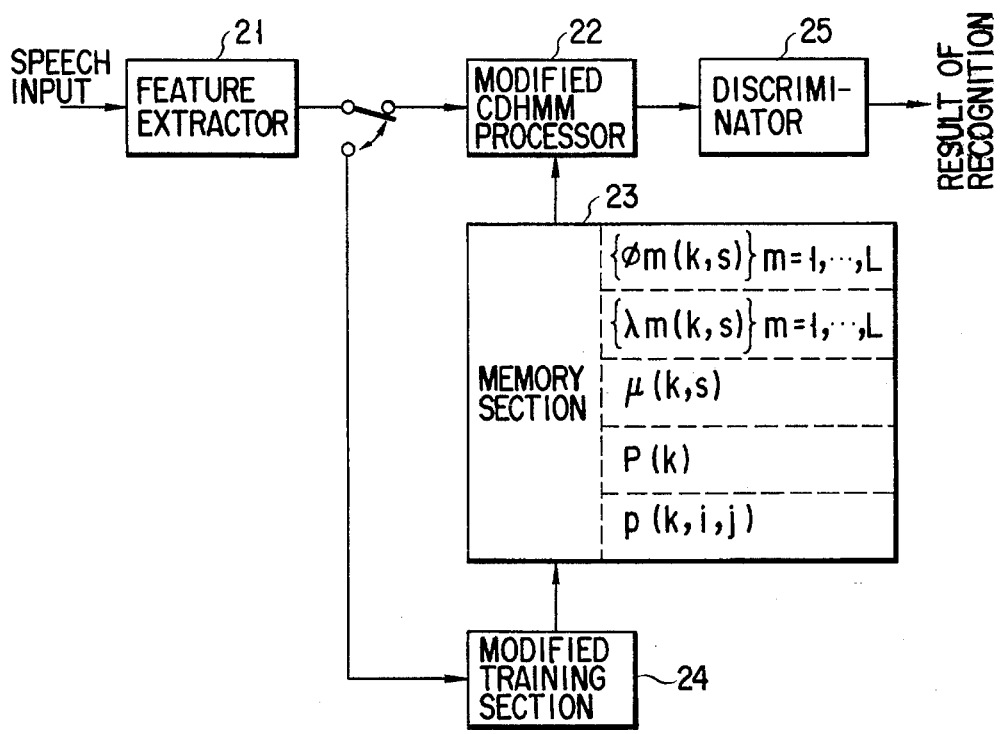
FIG. 3 is a block diagram showing an arrangement of a CDHMM speech recognition system according to a first embodiment of the present invention.

FIG. 3 shows an arrangement of the CDHMM speech recognition system. Basically in the CDHMM recognition system, an acoustic feature vector such as spectrum, a Linear Predictive Coding (LPC) cepstrum, a Δ cepstrum, or a two-dimensional segment thereof (e.g., time series) is extracted from input speech signal, and used to assign the input speech signal to one of predetermined categories on the basis of similarity between a sequence of the extracted feature vectors and CDHMMs of the predetermined categories k. Each of the CDHMMs is defined as a transition network model having two parameters of transition probabilities p(k,i,j) that a state Si transits to a next state Sj and output probabilities g(k,s) that a feature vector x is output in transition from the state Si to one of the states Si and Sj.

Referring to FIG. 3, the speech recognition system includes a feature extractor 21, a modified CDHMM processor 22, a memory section 23, a modified training section 24, a discriminator 25, and a switching section SW. A signal of uttered speech is input to the feature extractor 21. The feature extractor 21 sequentially extracts aforementioned feature vector from the input signal, and supplies a sequence of the extracted feature vectors x (a feature vector sequence X) to the switching section SW. The switching section SW is switched to supply the feature vector sequence X to the modified CDHMM processor 22 in a speech recognition mode, and to the modified training section 24 in a training mode.

Figure 1:
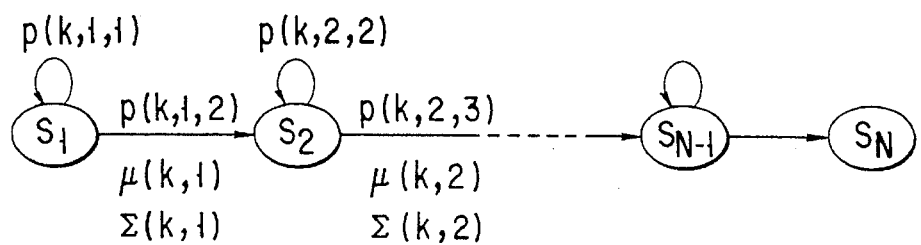
FIG. 1 is a view showing a typical transition network model used in conventional CDHMM speech recognition.
Figure 2:
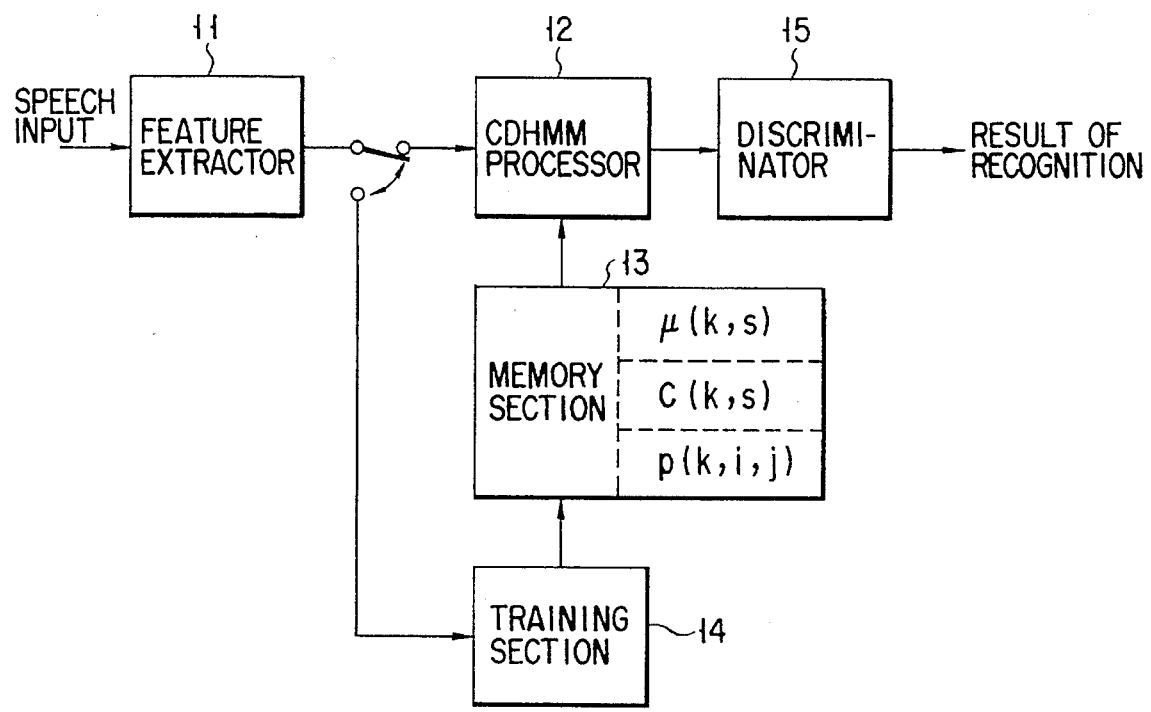
FIG. 2 is a block diagram showing an arrangement of a conventional CDHMM speech recognition system.

The modified training section 24 receives the feature vector sequence X supplied from the switching section SW in the training mode, and obtains average vectors μ(k,s), covariance matrices C(k,s), and transition probabilities p(k,i,j) thereof by means of the forward-backward algorithm, likewise the conventional training section 14 shown in FIG. 1. Further, the covariance matrices C(k,s) are subjected to a well-known Karhunen-Loeve (K-L) transformation (e.g., E. Oja, "Subspace Method of Pattern Recognition", Research Studies Press of UK, 1983) to obtain upper L eigen vectors serving as orthogonal vectors $\phi_m(k,s)$, and eigen values $\lambda_m(k,s)$ thereof. The training section 24 presets the orthogonal vectors $\phi_m(k,s)$, the eigen values $\lambda_m(k,s)$, the average vectors μ(k,s), and the transition probabilities p(k,i,j) in the memory section 23.

The memory section 23 stores probabilities P(k) that a category k appears, along with the orthogonal vectors $\phi_m(k,s)$, the eigen values $\lambda_m(k,s)$, the average vectors μ(k,s), and the transition probabilities p(k,i,j). The probabilities P(k) are not stored by the modified training section 24. If the appearing probabilities of the categories k are assumed to be equal to each other, P(k) need not be stored in the memory section 23.

The modified CDHMM processor 22 receives the feature vector sequence supplied from the switching section SW, and defines continuous density Hidden Markov Models of predetermined categories k by using the contents of the memory section 23. More specifically, the CDHMM processor 22 reads out the orthogonal vectors $\phi_m(k,s)$ and the transition probabilities p(k,i,j) and obtains output probabilities g(k,s) by introducing the orthogonal vectors $\phi_m(k,s)$ to the following equation (2).

$$g(k,s) = \log P(k) + 2 \sum_{m=1}^{L} [\phi_m(k,s) \cdot \{x - \mu(k,s)\}]^2 / \lambda_m(k) + 2 \log \prod_{m=1}^{L} \lambda_m(k,s) \quad (2)$$

where, $\phi_m(k,s)$ represents a set of orthogonal vectors, x represents an already normalized feature vector, [·] represents an inner product, and L represents the number of the orthogonal vectors (or the number of axis of the orthogonal vector set). The value of the number L depends on the number of degrees of x, and usually falls within the range of $3 \leq L \leq 40$.

The CDHMM processor 22 accumulates the sum of each value (logarithmic) of g(k,s) expressed by equation (2) and a corresponding logarithmic value of p(k,i,j) for the input feature vector sequence X, and supplies an accumulated value and accumulation count for each model to the discriminator 25.

The discriminator 25 discriminates a model M whose conditional probability Pr(X|M) is maximized according to the accumulated value and the accumulation count supplied from the modified CDHMM processor 22, and assigns the input speech signal to the category of the model M.

Additionally in equation (2), $\lambda_m(k,s)$ can be replaced by a weighting function $f_m(k,s)$ for obtaining an n square root of $\lambda_m(k,s)$. Such a modification is carried out when the recognition rate is improved by underestimating the value of a lower part.

The operation of this system will be described below.

In the training mode, a feature vector sequence X output from the feature extractor 21 is supplied via the switching section SW to the modified training section 24. The modified training section 24 determines orthogonal vectors $\phi_m(k,s)$, eigen values $\lambda_m(k,s)$, average vectors $\mu(k,s)$, and transition probabilities p(k,i,j) from the feature vector sequence X, and presets them in the memory section 23, which already stores P(k).

In the speech recognition mode, a feature vector sequence X output from the feature extractor 21 is supplied via the switching section SW to the modified CDHMM processor 22. The CDHMM processor 22 reads out the orthogonal vectors $\phi_m(k,s)$ and the transition probabilities p(k,i,j) from the memory section 23, obtains output probabilities g(k,s) by introducing the orthogonal vectors $\phi_m(k,s)$ to equation (2), accumulates the sum of each value (logarithmic) of g(k,s) and a corresponding logarithmic value of p(k,i,j) for the input feature vector sequence X, and supplies an accumulated value and accumulation count for each model to the discriminator 25. The discriminator 25 discriminates a model $_M$ whose conditional probability Pr(X|M) is maximized according to the accumulated value and the accumulation count supplied from the modified CDHMM processor 22, and assigns the input speech signal to the category of the model M.

In the first embodiment described above, the modified training section 24 obtains average vectors $\mu(k,s)$, covariance matrices C(k,s), and transition probabilities p(k,i,j) of a feature vector sequence X, likewise the conventional training section 14 shown in FIG. 1. Thereafter, the training section 24 obtains upper L eigen (orthogonal) vectors $\phi_m(k,s)$, and eigen values $\lambda_m(k,s)$ by the K-L transformation of the covariance matrices C(k,s), and presets them in the memory section 23. The memory section 23 stores the orthogonal vectors $\phi_m(k,s)$ instead of the covariance matrices C(k,s), which are conventionally stored in the memory section 13 shown in FIG. 1. Since the orthogonal vectors $\phi_m(k,s)$ are those eigen vectors which have great importance in recognition, a desirable recognition rate can be attained. Moreover, since the number of axes in $\phi_m(k,s)$ is less than that in C(k,s), the amount of calculation to be performed by the modified CDHMM processor 22 is reduced.

Figure 4:
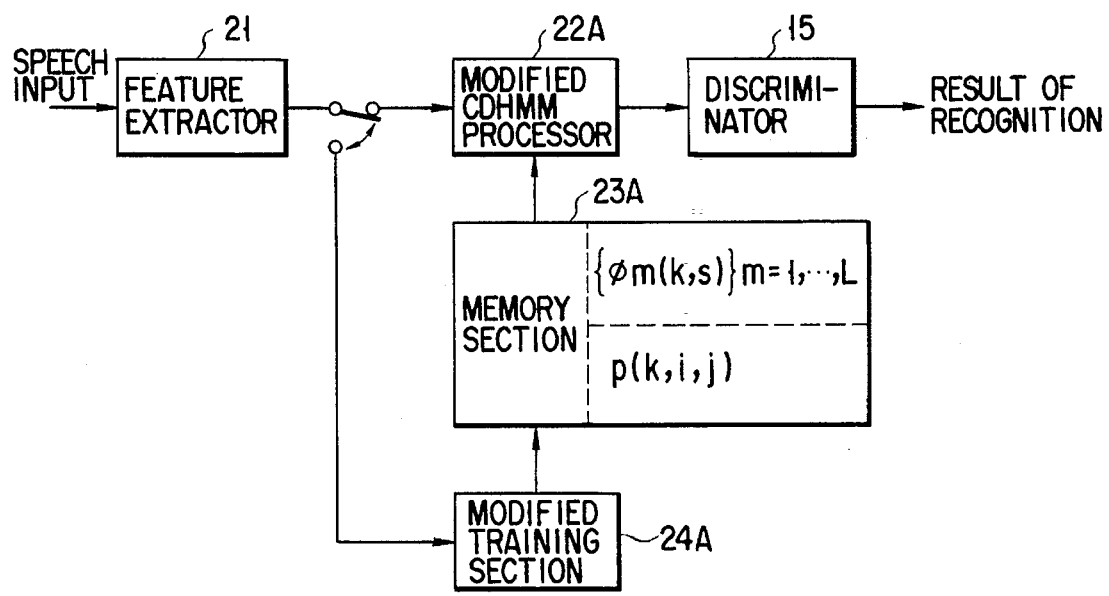
FIG. 4 is a block diagram showing an arrangement of a CDHMM speech recognition system according to a second embodiment of the present invention.

A CDHMM speech recognition system according to a second embodiment of the present invention will now be described with reference to FIG. 4. This recognition system has the same construction as the first embodiment, except for a CDHMM processor 22A, a memory section 23A, and a modified training section 24A. In FIG. 4, similar portions are represented by the same reference symbols as those in the first embodiment, and their detailed explanations are omitted for the sake of simplicity.

In this embodiment, the modified training section 24A receives a feature vector sequence X supplied from the switching section SW in the training mode, obtains transition probabilities p(k,i,j) and correlation matrices R(k,s) of the feature vector sequence X, and then obtains upper L eigen vectors serving as orthogonal vectors $\phi_m(k,s)$ by the K-L transformation of the correlation matrices R(k,s). The orthogonal vectors $\phi_m(k,s)$ and the transition probabilities p(k,i,j) are preset in the memory section 23A.

The modified CDHMM processor 22A receives a feature vector sequence X supplied from the switching section SW in the speech recognition mode, and defines continuous density Hidden Markov Models of predetermined categories k by using the contents of the memory section 23A. More specifically, the CDHMM processor 22A reads out the orthogonal vectors $\phi_m(k,s)$ and the transition probabilities p(k,i,j) from the memory section 23A and obtains output probabilities g(k,s) by introducing the orthogonal vectors $\phi_m(k,s)$ to the following equation (3).

$$g(k,s) = \sum_{m=1}^{L} [\phi_m(k,s) \cdot x]^2 \qquad (3)$$

where, $\phi_m(k,s)$ represents a set of orthogonal vectors, x represents an already normalized feature vector, [·] represents an inner product, and L represents the number of the orthogonal vectors (or the number of axis of the orthogonal vector set). The value of the number L depends on the number of degrees of x, and usually falls within the range of $3 \leq L \leq 40$.

The CDHMM processor 22A accumulates the sum of each value (logarithmic) of g(k,s) expressed by equation (3) and a corresponding logarithmic value of p(k,i,j) for the input feature vector sequence X, and supplies an accumulated value and accumulation count for each model to the discriminator 25.

The discriminator 25 discriminates a model M whose conditional probability Pr(X|M) is maximized according to the accumulated value and the accumulation count supplied from the modified CDHMM processor 22A, and assigns the input speech signal to the category of the model M.

Equation (3) can be regarded as equation (2) if P(k) and $\lambda_m(k,s)$ have common values in each category k and one of the following assumptions concerning the average vector f(k,s) is added.

Assumption 1: "An inverse replica is always present for an arbitrary feature vector". By this assumption, the value of the average vector $\mu(k,s)$ can be given as "0", and equation (3) becomes equivalent to equation (2) except for a bias component.

Assumption 2: "The average vector $\mu(k,s)$ asymptotically approximates to a common vector $\mu$ with an increase in quantity of training data". In this case, the feature vector x in equation (3) can be regarded as a result obtained by a kind of orthonormal transformation (x'−$\mu$)→x of the original vector x'. The common vector $\mu$ is an average vector of feature vectors obtained according to data used for training. Note that the common vector may be replaced by a vector $\mu(s)$ common to the categories k or a vector $\mu(k)$ common to the states.

Assumption 3: When assumption 2 is further defined, "the common vector $\mu$ to which the average vector $\mu(k,s)$ asymptotically approximates converges to a vector $\mu_0 = (\epsilon, \epsilon, \ldots, \epsilon)$ in which all the elements finally have the same values". In this case, the feature vector x in equation (2) is regarded as a vector obtained by the orthonormal transformation (x'−$\epsilon$)→x of the original vector x'. In addition, the orthonormal transformation (x'−Av(x')) x is also considered. Av(x') is the average value of the feature vectors x.

In equation (3), g(k,s) is not strictly the probability of appearance but can be called a degree of confidence of appearance of the feature vector x.

The operation of this system will be described below.

In the training mode, a feature vector sequence X output from the feature extractor 21 is supplied via the switching section SW to the modified training section 24A. The modified training section 24A determines orthogonal vectors $\phi_m(k,s)$ and transition probabilities p(k,i,j) from the feature vector sequence X, and presets them in the memory section 23A.

In the speech recognition mode, a feature vector sequence X output from the feature extractor 21 is supplied via the switching section SW to the modified CDHMM processor 22A. The CDHMM processor 22 reads out the orthogonal vectors $\phi_m(k,s)$ and the transition probabilities p(k,i,J) from the memory section 23, obtains output probabilities g(k,s) by introducing the orthogonal vectors $\phi_m(k,s)$ to equation (3), accumulates the sum of each value (logarithmic) of g(k,s) and a corresponding logarithmic value of p(k,i,j) for the input feature vector sequence X, and supplies an accumulated value and accumulation count for each model to the discriminator 25. The discriminator 25 discriminates a model M whose conditional probability Pr(X|M) is maximized according to the accumulated value and the accumulation count supplied from the modified CDHMM processor 22, and assigns the input speech signal to the category of the model M.

In the second embodiment described above, the modified training section 24A obtains correlation matrices R(k,s) and transition probabilities p(k,i,j) of a feature vector sequence X. Average vectors µ(k,s) and covariance matrices C(k,s), which are obtained by the conventional training section 14 shown in FIG. 1, are not obtained by the modified training section 24A. Thereafter, the training section 24A obtains upper L eigen (orthogonal) vectors $\phi_m(k,s)$ by the K-L transformation of the correlation matrices R(k,s), and presets the orthogonal vectors $\phi_m(k,s)$ and the transition probabilities p(k,i,j) in the memory section 23A. The memory section 23A stores the orthogonal vectors $\phi_m(k,s)$ in stead of the covariance matrices C(k,s), which are conventionally stored in the memory section 13 shown in FIG. 1. Since the orthogonal vectors $\phi_m(k,s)$ are those eigen vectors which have great importance in recognition, a desirable recognition rate can be attained. Moreover, since the number of axes in $\phi_m(k,s)$ is less than that in C(k,s), the amount of calculation to be performed by the modified CDHMM processor 22A is reduced.

The present invention is not limited to the aforementioned embodiments, and various modifications can be made without departing from the spirit and scope of the present invention.

In each embodiment, a feature sequence after speech analysis is used as feature vectors. For example, after a predetermined segment sequence is extracted from an input speech, vectors having the segment score as an element may be utilized as feature vectors. The speech recognition system is designed to process the feature vectors, it can withstand noise and various pattern deviations.

Further, the speech recognition system is operable in a training mode. However, this mode is not necessary if a memory section is provided which previously stores data identical to those obtained in the training mode. In this case, the switching section SW and the modified training section 24 or 24A can be eliminated.

Moreover, speech recognition systems are described in the first and second embodiments. However, the present invention can be applied to image recognition systems.

What is claimed is:

1. A recognition system comprising:

feature extracting means for extracting a feature vector x from an input signal; and recognizing means for obtaining continuous density Hidden Markov Models (HMMs) of predetermined categories K represented by transition network models each having parameters of transition probabilities p(k,i,j) that a state Si transits to a next state Sj and output probabilities g(k,s) that the feature vector x is output in transition from the state Si to one of the states Si and Sj, and for recognizing the input signal on the basis of similarity between a feature vector sequence x of the feature vectors x each extracted by said feature extracting means and the continuous density HMMs;

wherein said recognizing means includes memory means for storing a set of orthogonal vectors $\phi_m(k,s)$ provided for the continuous density HMMs, and processing means for obtaining each of the output probabilities g(k,s) for the continuous density HMMs in accordance with the orthogonal vectors $\phi_m(k,s)$ or a corresponding category k.

2. A recognition system according to claim 1, wherein said memory means includes a memory section for storing probabilities P(k) that a category k appears, the transition probabilities p(k,i,j), average vectors µ(k,s), the orthogonal vectors $\phi_m(k,s)$ formed of predetermined eigen vectors contained in covariance matrices C(k,s), and eigen values $\lambda_m(k,s)$, for each continuous density Hidden Markov Model (HMM).

3. A recognition system according to claim 2, wherein said processing means includes a processing section for obtaining the output probabilities g(k,s) by setting the orthogonal vectors $\phi_m(k,s)$ into a following equation EQ1, and accumulating a sum of each value of g(k,s) and a corresponding logarithmic value of p(k,i,j) for the feature vector sequence X to produce an accumulated value and an accumulation count for each model, and a discriminator for estimating similarity between the feature vector sequence X and each continuous density HMM from the accumulated value and accumulation count for each model, wherein $$g(k,s) = \log P(k) + 2 \sum_{m=1}^{L} [\phi_m(k,s)\{x - \mu(k,s)\}]^2/\lambda_m(k) + 2 \log \prod_{m=1}^{L} \lambda_m(k,s) \quad \text{(EQ 1)}$$

where, [·] represents an inner product, and L represents a number of axis of the orthogonal vector set.

4. A recognition system according to claim 3, further comprising training means for obtaining transition probabilities p(k,i,j), average vectors µ (k,s) and covariance matrices C(k,s) of the feature vector sequence X from said feature extracting means, obtaining upper L eigen vectors serving as the orthogonal vectors $\phi_m(k,s)$, and eigen values $\lambda_m(k,s)$ by a Karhunen-Loeve (K-L) transformation of the covariance matrices C(k,s), and presetting the orthogonal vectors $\phi_m(k,s)$, the eigen values $\lambda_m(k,s)$, the average vectors µ(k,s), and the transition probabilities p(k,i,j) in said memory section.

5. A recognition system according to claim 1, wherein said memory means includes a memory section for storing the transition probabilities p(k,i,j) and the orthogonal vectors $\phi_m(k,s)$ formed of predetermined eigen vectors contained in correlation matrices R(k,s) of the feature vector sequence X, for each continuous density HMM.

6. A recognition system according to claim 5, wherein said processing means includes a processing section for obtaining the output probabilities g(k,s) by setting the orthogonal vectors $\phi_m(k,s)$ into a following equation EQ2, and accumulating a sum of each value of g(k,s) and a corresponding logarithmic value of p(k,i,j) for the feature vector sequence X to produce the accumulated value and the accumulation count for each model, and a discriminator for estimating similarity between the feature vector sequence X and each continuous density HMM from the accumulated value and the accumulating count for each model, $$g(k,s) = \sum_{m=1}^{L} [\phi_m(k,s)x]^2 \qquad \text{(EQ 2)}$$

where, represents an inner product, and L represents a number of axis of the orthogonal vector set.

7. A recognition system according to claim 6, further comprising training means for obtaining transition probabilities p(k,i,j) and the correlation matrices R(k,s) of the feature vector sequence X from said feature extracting means, obtaining upper L eigen vectors serving as the orthogonal vectors $\phi_m(k,s)$ by a Karhunen-Loeve (K-L) transformation of the correlation matrices R(k,s), and presetting the orthogonal vectors $\phi_m(K,s)$ and the transition probabilities p(k,i,j) in said memory section.

8. A recognition system according to claim 1, wherein said input signal is a speech signal.

* * * * *

UNITED STATES PATENT AND TRADEMARK OFFICE
CERTIFICATE OF CORRECTION

PATENT NO. : 5,506,933
DATED : April 09, 1996
INVENTOR(S) : Tsuneo NITTA

It is certified that error appears in the above-indentified patent and that said Letters Patent is hereby corrected as shown below:

Claim 3, column 8, line 45, (in equation 1), after "$[\Phi_m(k,s)]$", insert -- · --.

Claim 6, column 9, line 13, (in equation 2), after "$[\Phi_m(k,s)]$", insert -- · --.

Claim 6, column 10, line 1, after "where", insert --[·]--.

Signed and Sealed this

Twenty-sixth Day of November 1996

Attest:

BRUCE LEHMAN

*Attesting Officer*   *Commissioner of Patents and Trademarks*